US010995007B2

(12) United States Patent
Egli et al.

(10) Patent No.: US 10,995,007 B2
(45) Date of Patent: May 4, 2021

(54) SYSTEM AND METHOD FOR PRODUCING AN AEROGEL COMPOSITE MATERIAL, AND AEROGEL COMPOSITE MATERIAL

(71) Applicant: ROCKWOOL International A/S, Hedehusene (DK)

(72) Inventors: Christoph Egli, Lachen (CH); Ivo Kym, Uznach (CH)

(73) Assignee: ROCKWOOL INTERNATIONAL A/S

( * ) Notice: Subject to any disclaimer, the term of this patent is extended or adjusted under 35 U.S.C. 154(b) by 162 days.

(21) Appl. No.: 16/303,642

(22) PCT Filed: May 22, 2017

(86) PCT No.: PCT/CH2017/000049
§ 371 (c)(1),
(2) Date: Nov. 20, 2018

(87) PCT Pub. No.: WO2017/197539
PCT Pub. Date: Nov. 23, 2017

(65) Prior Publication Data
US 2020/0247678 A1 Aug. 6, 2020

(30) Foreign Application Priority Data
May 20, 2016 (CH) .................................. 00656/16

(51) Int. Cl.
*B01J 4/00* (2006.01)
*B01J 19/24* (2006.01)
(Continued)

(52) U.S. Cl.
CPC ........... *C01B 33/1585* (2013.01); *B01J 4/001* (2013.01); *B01J 19/0053* (2013.01);
(Continued)

(58) Field of Classification Search
CPC . B01J 4/00; B01J 4/001; B01J 13/0091; B01J 19/00; B01J 19/0053; B01J 19/24;
(Continued)

(56) References Cited

U.S. PATENT DOCUMENTS 2,143,015 A * 1/1939 Kleinschmidt .......... B01J 19/30
261/96
2,437,713 A * 3/1948 Tannenberg ............. G01N 1/36
249/83
(Continued)

FOREIGN PATENT DOCUMENTS

DE 19648798 6/1998
EP 1690849 8/2006
(Continued)

*Primary Examiner* — Natasha E Young
(74) *Attorney, Agent, or Firm* — Morriss O'Bryant Compagni Cannon, PLLC

(57) ABSTRACT

A system and method for producing an aerogel composite material includes a reaction vessel having a movable carrier basket for receiving a plurality of fiber mats, and a plurality of plates to space the fiber mats apart from one another. Once the plates have been removed, there are gaps between the aerogel insulating boards, through which hot drying air can be blown during a drying process. The method has the advantage that the quantities of solvents and reagents to be disposed of are minimal, and in addition thereto, no complex work-up processes are necessary.

33 Claims, 4 Drawing Sheets

(51) Int. Cl.
*C01B 33/159* (2006.01)
*C01B 33/16* (2006.01)
*C01B 33/158* (2006.01)
*B01J 19/00* (2006.01)

(52) U.S. Cl.
CPC ......... *B01J 19/2445* (2013.01); *C01B 33/159* (2013.01); *C01B 33/163* (2013.01); *B01J 2219/00087* (2013.01)

(58) Field of Classification Search
CPC ............... B01J 19/2445; B01J 2219/00; B01J 2219/00049; B01J 2219/00051; B01J 2219/00074; B01J 2219/00087; C01B 33/00; C01B 33/113; C01B 33/12; C01B 33/14; C01B 33/157; C01B 33/158; C01B 33/1585; C01B 33/159; C01B 33/16; C01B 33/163; C01P 2004/00; C01P 2004/20; C01P 2006/00; C01P 2006/32; C04B 14/00; C04B 14/02; C04B 14/30; C04B 14/301; C04B 14/302; C04B 28/00; C04B 28/24; C04B 30/00; C04B 30/02; C04B 38/00; C04B 38/0045; C04B 2111/00; C04B 2111/20; C04B 2111/28; C04B 2201/00; C04B 2201/30; C04B 2201/32; C09C 1/00; C09C 1/28; C09C 1/30; C09C 1/3081
See application file for complete search history.

(56) References Cited

U.S. PATENT DOCUMENTS

| | | | |
|---|---|---|---|
| 5,679,312 A | 10/1997 | Jin et al. | |
| 5,746,992 A | 5/1998 | Yoldas et al. | |
| 2006/0260927 A1 | 11/2006 | Abazajian | |
| 2013/0309623 A1* | 11/2013 | Chou | F27D 5/0006 432/253 |
| 2016/0258153 A1* | 9/2016 | Koebel | C01B 33/145 |

FOREIGN PATENT DOCUMENTS

| | | | |
|---|---|---|---|
| WO | WO9306044 | 4/1993 | |
| WO | WO9408681 | 4/1994 | |
| WO | WO9425149 | 10/1994 | |
| WO | WO2010126792 | 11/2010 | |
| WO | WO2012053951 | 4/2012 | |
| WO | WO2013005395 | 1/2013 | |
| WO | WO2013053951 | 4/2013 | |
| WO | WO2015014813 | 2/2015 | |
| WO | WO-2015014813 A1 * | 2/2015 | E04B 1/78 |

* cited by examiner

SYSTEM AND METHOD FOR PRODUCING AN AEROGEL COMPOSITE MATERIAL, AND AEROGEL COMPOSITE MATERIAL

CROSS-REFERENCE TO RELATED APPLICATIONS

This application is a national phase entry under 35 U.S.C. § 371 of PCT/CH2017/000049, now WO 2017/197539, filed on May 22, 2017, which claims priority to Swiss Patent Application No. 00656/16 filed on May 20, 2016, the entirety of each of which is incorporated by this reference.

FIELD OF THE INVENTION

The present invention relates to a system and a method for producing an aerogel composite material and a composite material obtainable by the method as a high-performance insulating material.

STATE OF THE ART

Aerogels have a low density, a large porosity with open pores in the range <50 nm and a large inner surface. This results in a low thermal conductivity. Accordingly, aerogels are also suitable as thermal insulation materials. The high porosity also leads to a low mechanical stability of the aerogel.

Therefore, composites of fiber materials and aerogels have been proposed in recent years. Such composites can be used for example as insulation materials. In WO 93/06044, for example, a method is disclosed for producing an aerogel matrix composite material with the following steps:
Preparing of an aerogel precursor
Mixing the aerogel precursor with fibers,
Aging of the aerogel precursor containing the fibers to produce a gel,
Immersing the gel in a solvent suitable for supercritical drying and
Drying the gel under supercritical conditions.

Suitable fibers which may be embedded in the aerogel are, among others, also glass fibers or rockwool fibers. However, the method described has the disadvantage that the gel must be dried under supercritical conditions, for which an autoclave is required, in which usually at least one solvent exchange is performed. This is a very complex and time-consuming process. The drying requires special equipment (pressure reactor for critical point drying; for example: drying of $CO_2$ at >74 bar/>30° C. Accordingly, the supercritical drying of aerogels is only suitable for small batches and on a laboratory scale.

Because of the complexity of supercritical drying of gels, a method has been developed, according to which also a subcritical drying of the gel under 150° C. in the circulating air flow and at normal pressure is possible. In the subcritical drying of a gel, the free Si—OH groups of the resulting gel should first be deactivated for further condensation. This happens for example by adding trimethylchlorosilane to the gel (see F. Schwertfeger, D. Frank, M. Schmidt, "Hydrophobic waterglass based aerogels without solvent exchange or supercritical drying" in Journal of Non-Crystalline Solids, 225 (1998), p. 24-29). The trimethylchlorosilane reacts with separation of HCl with the OH groups of the silicate surface of the gel. By hydrophobizing the silicate surface, the water is displaced from the pores of the gel. Hexamethyldisiloxane and excess trimethylchlorosilane form the organic phase and remain in the pores of the gel. The resulting hydrochloric acid initially saturates the water phase and then leaks at higher concentrations into the gas phase.

However, the method described has the disadvantage that it cannot be used in conjunction with rockwool fibers, since the freed hydrochloric acid partially dissolves the rockwool fibers. Rockwool consists of at least 52 wt.-% of acid-soluble fractions (metal oxides such as $Al_2O_3$, CaO, MgO and $Fe_2O_3$). For this reason, glass wool based aerogels are currently used, which on the one hand are sufficiently stable in acidic pH, but on the other hand have only an insufficient temperature resistance in case of fire.

WO 94/25149 describes a method for producing a highly porous xerogel in which the surface of the gel is hydrophobized with surface-modifying compounds in order to reduce the capillary pressure in the pores of the gel before drying so that the gel does not collapse at the final drying step. The method consists of a sequence of aging, washing and drying steps. The method described is very complex, because before and after the hydrophobizing with trimethylchlorosilane, the gel must be washed with aprotic solvents. Another disadvantage is the hydrochloric acid released during the hydrophobic treatment, which would attack, for example, rockwool fibers.

DE-OS-196 48 798 describes a method for the preparation of organically modified aerogels by surface modification of the aqueous gel (without prior solvent exchange) and subsequent drying. The silylating agent is hexamethyldisiloxane (HMDSO). In addition, it is also possible to use a base or acid as the catalyst for the hydrophobization reaction. The acids are hydrochloric, sulfuric, phosphoric, hydrofluoric, oxalic, acetic or formic acid, but hydrochloric acid is preferred. Before drying, the silylated gel may optionally be washed with a protic or aprotic solvent. According to the teaching of DE-OS-196 48 798, the gel formed is dried in subcritical conditions. Since, according to the teaching of DE-OS 19648798, the use of organic solvents is completely dispensed with, all SiOH groups obtainable for the silylating agent used can react with the silylating agent. As a result, a very high degree of occupancy of the inner surface of the hydrogel can be achieved according to DE-OS-196 48 798.

WO 2013/053951 discloses a method for producing a xerogel with a thermal conductivity between 5 and 25 mW/mK, in which in a first step, a sol is poured into a reactor in which a fibrous reinforcing material was previously arranged. The sol is then gelled, aged and rendered hydrophobic. Then, the hydrophobized alcogel is first pre-dried at temperatures up to 80° C. and then dried under subcritical conditions and temperatures >100° C., between 120° C. and 140° C. until the alcohol content is <3%. According to an experiment (Example 3), a predrying is absolutely necessary to obtain a material with a thermal conductivity of less than 25 mW/m K. In the described method, all steps, except for the last-mentioned step, can be carried out in the same reactor. Of importance is that the inner walls have a distance of 70 mm or less from each other. If larger wall spacings are selected, then the fiber-reinforced xerogels produced have a thermal conductivity >25 mW/km.

The alcogel formed in the second step has an alcohol content between 15% by weight and 90% by weight relative to the weight of the original sol. The hydrophobizing with HMDSO (hexamethyldisiloxane) takes place in the presence of hydrochloric acid at a pH of between 1 and 3. As an alternative to the use of hydrochloric acid, formic acid is suggested.

U.S. Pat. No. 5,746,992 relates to the production of a silicon aerogel. In the preparation process, the alcohol from the alcogel is removed under subcritical conditions. According to one embodiment, the hydrolysis of tetra-thoxysilane takes place in two stages. In a first stage, the tetraethoxysilane, methanol, some water and nitric acid are mixed together in a glass vessel, the glass vessel sealed and kept at 60° C. for 24 hours. During this time, the tetraethoxysilane partially hydrolyzes under acidic conditions. Thereafter, the mixture is basified by adding an aqueous/alcoholic ammonia solution and kept again at 60° C. for 24 hours to achieve secondary hydrolysis under basic conditions. Under these conditions, a clear silica gel is obtained, which after the drying in a furnace had an internal particle porosity of 74 percent. According to U.S. Pat. No. 5,746,992, no hydrophobization of the gel is provided.

WO 2015/014813 discloses a method for producing an aerogel material which is similar to that of WO 2013/053951. As already described in WO 2013/053951, an alcoholic medium is first prepared in an alcoholic medium, which can be reacted with an acid-catalytically activatable hydrophobizing agent, in this case HMDSO. The novelty with respect to WO 2012/053951 is that the hydrophobizing HMDSO is added to the silica sol already in the first step. The volume fraction of the hydrophobizing agent in the sol is 3 to 80%. This is activated only after formation of the gel, which may optionally also be aged, by release or addition of at least one hydrophobizing catalyst interacting with the hydrophobic agent.

WO 2015/014813 describes an exemplary embodiment for producing a granulate, which is characterized in that the gel formed and aged is mechanically comminuted, then transferred to a closed pressure vessel and hydrophobized by HCl in the presence of HMDSO, and then initially predried on a conveyor belt at 50° C. and then completely dried at 150° C.

In another example, an aerogel insulation board is prepared by adding a slow release agent doped with 10% HCl to an alcoholic solution containing a 22% $SiO_2$ content of polyethoxydisiloxane sol and HMDSO. After adding an ammonia solution, the mixed sol is placed in a fit form previously laid out with a polyester non-woven fiber mat. After a 5-hour aging, the gel plate is lifted out of the mold and stored in a closed vessel for 24 h at 65° C. and hydrophobized. At this temperature, HCl exits the microencapsulation and activates the HMDSO present. The vessel is then opened and the gel plate is first dried at 50° C. and then at 130° C.

WO 2013/05395 discloses a vessel capable of receiving solid catalyst particles and is arranged in a region of a distillation column. The vessel has a perforated bottom plate connected to the peripheral side wall for receiving the solid catalyst particles in the interior space of the vessel and allowing the passage of liquid through the bottom of the vessel. In addition, the vessel has a vessel cover for accumulating liquid, wherein the vessel cover is connected to the peripheral side wall and covers the inner space. The vessel cover has a perforated plate to prevent the passage of liquid from the vessel cover to the catalytic reaction zone.

U.S. Pat. No. 5,679,312 discloses a reactive stripping apparatus for continuously performing chemical reactions to separate the reactants from at least one of the reaction products in a reactor column having a plurality of perforated plate bottoms therein connected to a plurality of recirculation pipes. Part of each recirculation pipe, part of the sidewall of the reactor column and one of the perforated plate bottoms together form a chamber. Inlets in the upper part and along the side wall of the reactor column above the lowermost plate tray serve to supply liquid reactants. An inlet and an outlet, which are provided in the lower part of the reactor column, serve to introduce an inert gas stream or to discharge the reaction mixture. At the upper part of the reactor column, an outlet is provided for discharging the flow of inert gas with at least one lower boiling reaction product from the reaction mixture.

U.S. Patent Application No. 2006/260927 discloses an apparatus and method for continuous reactive catalytic distillation and on-line regeneration of a solid support catalyst using a reactive catalytic distillation apparatus. This has a distillation column, which is divided by a partition wall in a first and a second functional part. At the lower first part, an evaporator is connected via a feed and a recirculation line in order to heat the feed for evaporation. However, the evaporation can also be carried out by fresh steam injection or an at least partially vaporized feed can take place. Furthermore, a vapor/liquid contacting device is provided in the first part. Depending on the application, a product feed opening and a product outlet opening may also be provided in the first part. The second functional part of the distillation column is connected via a steam line to an external condenser to remove steam, wherein the condensate is passed via a line back to the second part of the distillation column. Like the first part, the second part may also have a steam/liquid contacting device. Furthermore, at least one steam port and at least one liquid port are connected with the second functional part.

A catalytic distillation reactor is connected to the at least one steam port and the at least one liquid port of the first functional part. The at least one catalytic distillation reactor is filled with a solid support catalyst. The at least one steam port and the at least one liquid port of the second functional part of the distillation column are also connected with the at least one distillation reactor. A catalyst regenerator connected to the catalytic distillation reactor via respective lines serves to regenerate spent catalyst.

EP-A-1 690 849 describes a method and an apparatus for the preparation of carboxylic acid esters with a reactive distillation. The system comprises a first distillation column, which is preceded by a pre-reactor and followed by a second column. In the pre-reactor a first phase of esterification without material separation is carried out. An input of the pre-reactor is connected by recirculation lines to the first column and/or second column, namely by an organic phase recirculation line of the first overhead product or by a distillate recirculation line of the second overhead product.

Advantages of the Invention

The present invention advantageously provides a system and a method for the preparation of an aerogel-fiber composite material, that allow the most cost-effective production of the composite material on an industrial scale. In particular, the time needed to produce the aerogel composite plates should be as short as possible. The handling should also be as simple as possible and the use of means in the form of reagents and solvents should be as low as possible. The aerogel material (without fiber matrix) should have a porosity of >80%, >90% or >92%, and a density <0.2 g/ml, 0.15 g/ml or <0.12 g/ml. The present invention also provides an aerogel composite which may also contain acid-sensitive fibers, such as rockwool fibers. The present invention also provides a fiber aerogel composite with a thermal conductivity λ<20 mW/mK or <16 mW/mK, which may be produced on an industrial scale.

SUMMARY OF THE INVENTION

The invention relates to a method for producing an aerogel, in which initially a silicate sol is prepared by an organosilane compound, such as tetraethoxysilane (TEOS), being hydrolyzed under acidic or basic conditions, then a gel is produced by adding a base to the sol, and the resulting gel is then aged. After aging, the gel is hydrophobized with a silylating agent in the presence of an acid catalyst, followed by drying of the gel, as by subcritical drying.

In the context of the present invention, the term aerogels is to be understood to mean highly porous solids, in particular those based on silicates, irrespective of the drying method. In this sense, xerogels and lyogels are also subsumed under the term "aerogel," whereby the porous gels produced by the method according to the invention should be correctly termed xerogels.

According to the invention, a system includes:
a reaction vessel with a cover,
a removable basket for receiving a plurality of fiber mats in the reaction vessel, and
a plurality of plates to space the fiber mats apart from each other.

The system according to the invention has the advantage that it is suitable for the industrial production of aerogel fiber mats and that the essential reaction steps can be carried out in one and the same reactor. A plurality of fiber mats may be simultaneously arranged within the reaction vessel. These are spaced from each other by plates in the manufacturing process. After gelling and hydrophobization, the plates are removed so that voids are formed between the aerogel insulation boards through which hot air can be blown.

Advantageously, a heat exchanger device is provided on the reaction vessel in order to heat or cool the reactor or the reactor contents to a certain temperature. This has the advantage that the reactor contents can be heated rapidly to a certain temperature.

According to an advantageous embodiment, a connection port for injecting a drying gas is provided on the reaction vessel, wherein a supply line for the drying gas is connected thereto and is in communication with a heating device. On the reaction vessel, a discharge for the drying gas is also provided, which is in communication with a heat exchanger. A blower or a pump may be provided to blow or draw the drying gas into the reaction vessel.

Advantageously, the heat exchanger is connected to a reactor via a recirculation line. This means that the drying gas is circulated, wherein volatile substances expelled with the hot drying gas (solvents and reagents) are conveniently condensed out. After condensation, the drying gas is reheated to the desired temperature and fed back to the reactor.

To facilitate handling, a removable carrier basket is provided in the reaction vessel, in which the fiber mats are arranged for the production of the composite plates. The use of carrier baskets has the advantage that a second basket can be loaded with fiber mats and prepared while the first basket is still in the reaction vessel. This type of drying has been found to be particularly advantageous because a predrying, as considered necessary in the known art, can be dispensed with. It is also conceivable that the drying takes place in a vacuum.

In order to further reduce the necessary manufacturing time for the aerogel insulation boards, a mixer/settler with a stirrer is provided and communicates via a line on the one hand with the reaction vessel and on the other hand via another line with the reservoir for the solvent. Due to the presence of the mixer/settler, the next production step can already take place in the reaction vessel while at the same time the contents of the mixer/settler are being processed. The purified solvent or reagent can then be reused in a next production step.

Advantageously, the mixer/settler is connected via a line with a distillation apparatus, so that the contents of the mixer/settler can be subsequently processed via distillation. Purified solvent can then be reintroduced again in the reservoir of the same.

In one embodiment, the mixer/settler is connected via another line with the reservoir for the hydrophobizing agent. This allows the unused hydrophobizing agent in a next batch process to be reused.

The subject matter of the present invention is also a system comprising a reaction vessel that is in communication via recirculation lines directly or indirectly on the one hand with the reservoir for the solvent and the reservoir for the hydrophobizing agent. This system has the advantage of allowing the rational, industrial production of monolithic aerogel insulation boards. By minimizing the consumption of solvents and reagents, the cost of the manufacturing process can be kept low.

The present invention also comprises a method for producing a fiber-reinforced aerogel plate wherein initially a plurality of fiber mats and a corresponding number of intermediate plates are arranged alternately in a reaction vessel, so that two fiber mats are separated from each other by a respective intermediate plate, the silicate sol is added to the reaction vessel and gelling is started and optionally the gel is aged; after gelling and optional aging of the gel, the reaction solution is drained, the intermediate plates are removed and the formed, fiber-reinforced aerogel plates are dried at temperatures >100° C.

The inventive method has the significant advantage for an industrial process that a larger number of aerogel fiberboards may be produced at once and the aerogel fiber mats may be dried in the reaction vessel.

Advantageously, adjacent fiber mats are arranged at a distance of at least 10 mm, at least 20 mm, or at least 30 mm from each other. This has the advantage that gaps for the blowing through of a hot stream of air are present and the aerogel insulation boards can be dried in situ. As a result, no additional handling step is necessary.

Conveniently, the fiber mats are placed in a carrier basket which fits into the reaction vessel. As little dead space as possible should remain between the basket and the reactor inner wall. The carrying basket should fill the vessel interior as completely as possible so that no unnecessary dead spaces are present. Thus with a minimum amount of solvent and reagents, a larger number of aerogel fiber boards can be produced.

According to one embodiment of the method, the drying of the fiber-reinforced aerogel plates takes place directly in the reaction vessel. This has the advantage that no additional handling of the aerogel insulation boards is necessary. Advantageously, the drying is performed by blowing hot air through the reaction vessel. This is an efficient method, especially if the drying occurs at temperatures >120° C., >130° C. or at temperatures between 140° C. and 160° C. In contrast to the prior art, a pre-drying can be dispensed with so that the time of preparation of a batch of aerogel insulation boards is greatly shortened. For drying the fiber-reinforced aerogel boards, the hot drying gas is passed through the reactor for at least five, at least ten or at least 15 hours. While the drying gas at the beginning of the drying process in the reactor still cools down, the reactor and its contents are warmed up to the temperature of the hot drying gas after three to five hours. Advantageously, the drying gas is circulated and volatiles contained in the hot drying gas are continuously condensed, so that the newly added drying gas can absorb solvent and volatile reaction medium again.

The gelling, hydrophobizing and drying (steps b, c and d) are carried out in one and the same reactor. This is particularly efficient since time-consuming transport steps between the individual steps can be dispensed with. Also, valuable space can be saved if all steps can be performed in the same vessel.

Advantageously, the hydrophobizing is carried out in the presence of nitric acid. Nitric acid has the advantage that it is surprisingly also compatible with rockwool fibers, which was unpredictable. The hydrophobizing agent is hexamethyldisiloxane (HMDSO).

Although it has generally been attempted to keep the water content as low as possible because of the final drying step, it has surprisingly been found by the present inventors that a proportion of water (v/v) of at least 4% or at least 7% is particularly advantageous. Although water is not directly involved in the hydrophobization reaction, the quality of the aerogel insulation boards produced is better when water is present. Surprisingly, the hydrophobization succeeds even if the weight percentage of hydrophobizing agent is at least 50%.

Advantageously, the pH in the hydrophobization is adjusted to a value between 1 and 7, preferably between 1 and 5, or between 1 and 3. In the acidic range at about pH 2, HMDSO reacts rapidly with the still free Si—OH groups.

Advantageously, ethanol is used for the individual steps of the production method. Ethanol can be procured cost-effectively and can be easily removed from the aerogel.

Advantageously, the silicate sol is prepared by hydrolysis of alkoxysilanes or hydroxyalkoxysilanes, such as of tetraethoxysilane (TEOS) or trimethylchlorosilane. The use of TEOS has the advantage that it is soluble in alcohol, such as EtOH. Accordingly, the preparation of the sol can be carried out in alcohol, an alcoholic or an alcohol-containing solvent mixture, which is advantageous for the process, since less water is present in the pores of the later formed gel. Under an alcoholic solvent mixture, a mixture is meant in which alcohol is the main constituent and has a volume fraction of >90% by volume or >95% by volume. In contrast, an alcohol-containing solvent mixture is considered to be such that the percentage by volume of the alcohol or alcohols is <50% by volume or <40% by volume.

According to a particularly advantageous variant of the method, a prehydrolyzed sol is used. This significantly reduces the duration of the gel production process. Prehydrolyzed sols are stable and storable, and are commercially available. They can also be produced continuously in a parallel manufacturing process.

Prehydrolyzed sols are used which are present in an amount of between 5% and 30% (m/m) of $SiO_2$, between 10% and 25% (m/m) of $SiO_2$ or between 15% and 20% (m/m) in alcohol, such as ETOH.

The preparation of the sol can be carried out by hydrolysis of tetraethoxysilane (TEOS), which is initially charged in a solvent, such as EtOH.

Conveniently, the gelling takes place in a temperature range between 30° C. and 80° C., between 50° C. and 75° C., or between 60° C. and 70° C.

Advantageously, the hydrolysis, gelling and hydrophobizing are performed in a substantially alcoholic solvent, such as EtOH, wherein expediently the proportion of water is less than 20 vol. %, less than 10 vol. % or less than 5 vol. %. It has been found that a small amount of water has a positive influence on the quality and particle size of the manufactured aerogel.

By optimizing the individual process steps, it is surprisingly possible to hydrophobize without prior solvent exchange. This has the great advantage that, on the one hand, the process is faster and, on the other hand, lower amounts of solvent are consumed.

In principle, it is conceivable to add the silylating agent in the initial step. This is possible when a silylating agent which is stable, for example, in the alkaline state is used and the sol preparation and gelling are carried out in the alkaline state. A suitable silylating agent which is stable in the alkaline state is, for example, HMDSO.

A further subject of the present invention is an aerogel-fiber composite material obtainable by mixing the sol produced according to the described method with rockwool fibers. The aerogel-fiber composite material has a porosity of >90% and a thermal conductivity <18 mW/mK. Surprisingly, the mineral fibers are not significantly dissolved during production, which could not be expected due to the known acid sensitivity of rockwool fibers.

Although in principle also glass wool fibers can be used for the production of the composite material, rockwool is used. Rockwool fibers have the advantage over glass fiber fibers that their fire resistance is much better.

BRIEF DESCRIPTIONS OF THE DRAWINGS

The invention will be explained in more detail with reference to the following examples. In particular, FIG. 1 schematically shows an industrial system with a reaction vessel, various reservoirs for receiving the necessary agents and solvents for the production of fiber-reinforced aerogel plates;

DETAILED DESCRIPTION OF THE INVENTION

Figure 1:
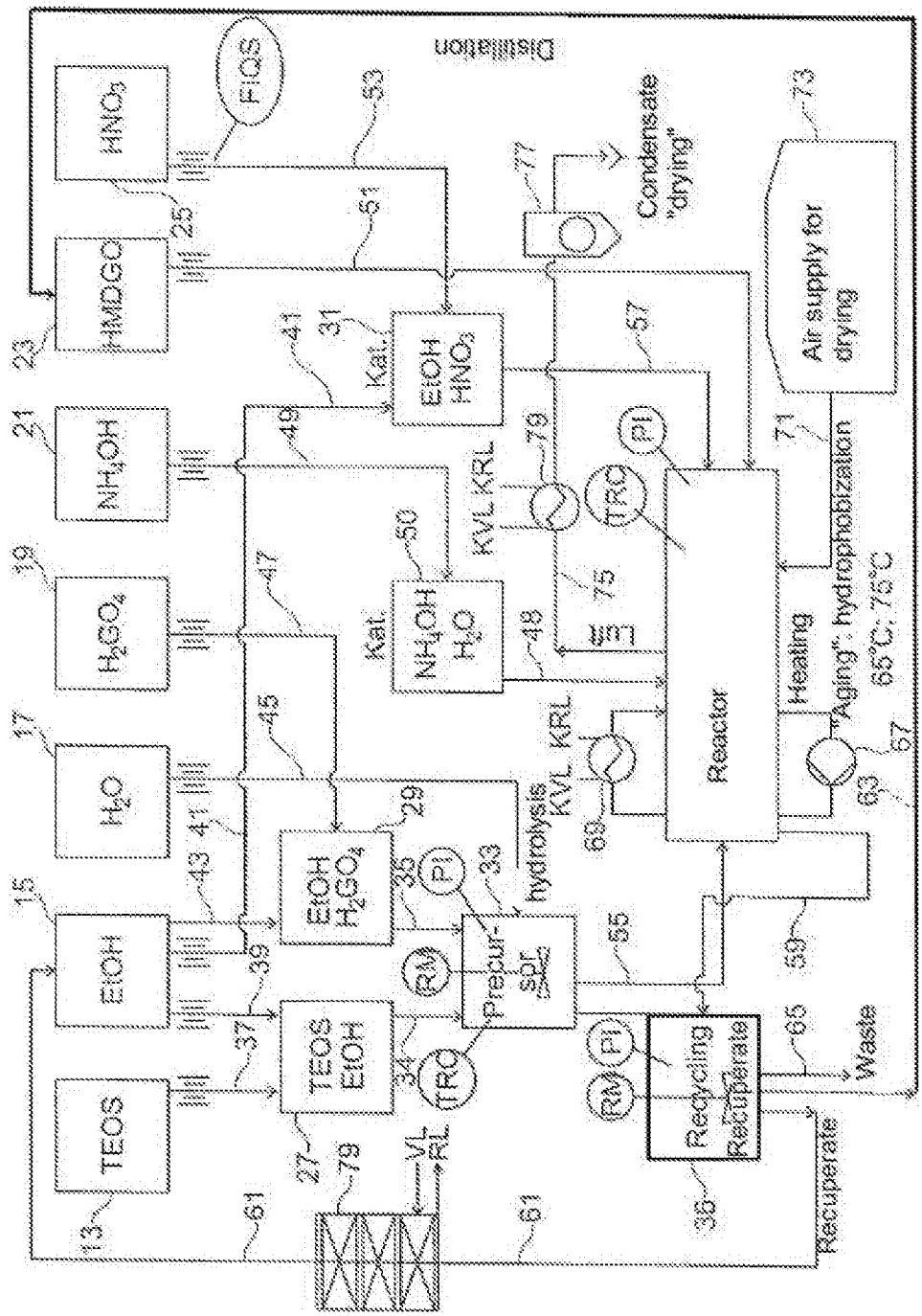
Figure 2:
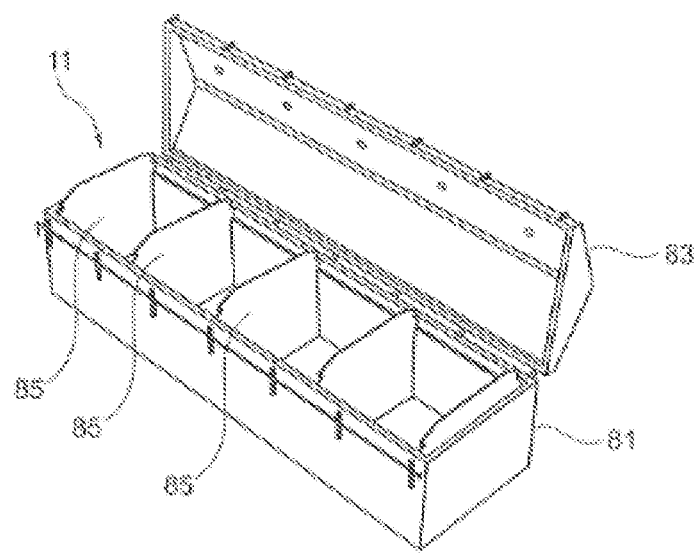
FIG. 2 shows an embodiment of a reaction vessel consisting of a double-walled trough, a cover for closing the trough; and a plurality of carrier baskets accommodated in the vessel for simultaneously receiving and transporting a plurality of fiber mats.

FIG. 1 schematically shows an industrial system for the production of aerogel plates with a reaction vessel 11, various reservoirs 13, 15, 17, 19, 21, 23 and 25 for receiving the reactants and solvents for carrying out the reaction, as well as vessels 27, 29 and 31 for the preparation of the reaction mixtures and intermediate storage of the partially spent reaction solutions. The storage, reaction and mixing vessels are connected to each other via lines 37 to 63, so that the necessary reaction mixtures can be produced. Specifically, the following vessels and lines are defined:
  reaction vessel 11,
  reservoir 13 for an organosilane compound (TEOS)
  reservoir 15 for solvent (EtOH)
  reservoir 17 for water
  reservoir 19 for sulfuric acid (H2S04)
  reservoir 21 for aqueous ammonia solution (NH$_4$OH), reservoir 23 for hydrophobizing agent (HMDSO),
reservoir 25 for nitric acid (HNO3),
mixing vessel 27 for producing an alcoholic TEOS solution,
mixing vessel 29 for producing a diluted mixture of EtOH and H2SO4,
mixing vessel 31 for preparing a diluted ammonia solution,
reaction vessel 33 for producing a sol,
connecting line 34 between the reaction vessel 33 and the mixing vessel 27
connecting line 35 between the reaction vessel 33 and the mixing vessel 29
vessel 36 for the intermediate storage of the partially spent reaction mixture,
line 37 for connecting the reservoir 13 with the mixing vessel 27
line 39 for connecting the reservoir 15 with the mixing vessel 27
line 41 for connecting the reservoir 15 with the mixing vessel 31
line 43 for connecting the reservoir 15 with the mixing vessel 29
line 45 for connecting the reservoir 17 with the reaction vessel 33
line 47 for connecting the reservoir 19 with the mixing vessel 29
line 49 for connecting the reservoir 21 with the reactor 11
line 51 for connecting the reservoir 23 with the reactor 11
line 53 for connecting the reservoir 25 with the mixing vessel 31
line 55 for connecting the reaction vessel 33 with the reactor 11
line 57 for connecting the mixing vessel 31 with the reactor 11
line 59 for connecting the reactor 11 with the intermediate vessel 35
line 61 for connecting the intermediate vessel 35 with the reservoir 15
line 63 for connecting the intermediate vessel 35 with the reservoir 23
  65 discharge line for residues
  67 pump
  69 heat exchangers
  71 supply line for the drying gas
  73 heating source in the supply line 71
  75 discharge line
  77 pump
  79 distillation column The core of the schematically illustrated production system according to FIG. 1 is the reaction vessel 11. This can be heated by means of the heating/cooling circuit 67, 68, 69 to a certain temperature, usually 60 to 80° C., and maintained at this temperature. A supply line 71 leads into the reaction vessel, through which a drying gas, such as air, can be blown into the reaction vessel 11. In the supply line 71, a heating source 73 is integrated, which allows the gas or the air to be heated to a temperature of up to about 200° C., or about 150° C. For discharging the air, a discharge line 75 is provided. This is in connection with a pump 77 for drawing the drying gas. In the discharge line 75, a heat exchanger 79 is provided, by means of which a large part of the solvent entrained in the drying gas is condensed. The remainder of the solvent contained in the drying gas is separated in the pump 77, such as a cyclone separator. Subsequently, the dried drying gas can be returned to the supply line 71 again.

The reaction vessel 11 communicates via the connecting line 55 with the reaction vessel 33. The reaction vessel 33 serves to produce a sol and is in turn connected via the connecting lines 34, 35 to the mixing vessel 27 on the one hand and to the mixing vessel 29 on the other hand. The connecting line 37, which is in communication with the TEOS reservoir 13, and on the other hand, the connecting line 39, which communicates with the solvent reservoir 15, enter the mixing vessel 27. The mixing vessel 29 is also connected via the connecting line 43 with the solvent reservoir 17 and, on the other hand, via the connecting line 47 with the sulfuric acid reservoir 19. Through this arrangement of vessels and connecting lines, a sol can be prepared and transferred to the reaction vessel 11.

The reaction vessel 11 is also connected via the connecting line 57 with the mixing vessel 31. The mixing vessel 31 is used to prepare a diluted, alcoholic nitric acid solution and is connected for this purpose via the connecting lines 41, 53 on the one hand to the solvent reservoir 15 and on the other hand to the nitric acid reservoir 25. With the nitric acid solution in the manufacturing process, the existing gel is acidified for the subsequent hydrophobizing with HMDSO.

The supply of HMDSO in the reaction vessel 11 occurs via the connecting line 51, which connects the vessel 11 with the HMDSO reservoir 23.

Last but not least, the reaction vessel 11 is also connected to the ammonia reservoir 21 via the connecting line 49. The ammonia solution is needed in the manufacturing process to initiate gelling. Optionally, a vessel 50 may be provided to prepare a diluted ammonia solution.

The reaction solutions present in the reaction vessel 11 can be discharged via line 59 into the vessel 36, which serves as a settler and for intermediate storage. Depending on the process step, the contents of the vessel 36 are conducted either via the line 63 into the HMDSO vessel or via the line 61 into the solvent reservoir 15. Via the line 65, the contents can also be supplied for disposal. For working up the solvent, a distillation column 79 is provided in the connecting line 61, by means of which the solvent used for the main purpose can be separated from other reaction components.

The exemplary embodiment of a reaction vessel 11 shown in FIGS. 2 to 6 serves to receive a plurality of fiber boards and is designed for the industrial production of aerogel composite thermal insulation boards. The reaction vessel 11 comprises a trough 81, a cover 83 for closing the vessel and a plurality of carrier baskets 85, which can be arranged in the trough 81. The reaction vessel 11 is therefore a trough 81 in this embodiment.

Figure 3:
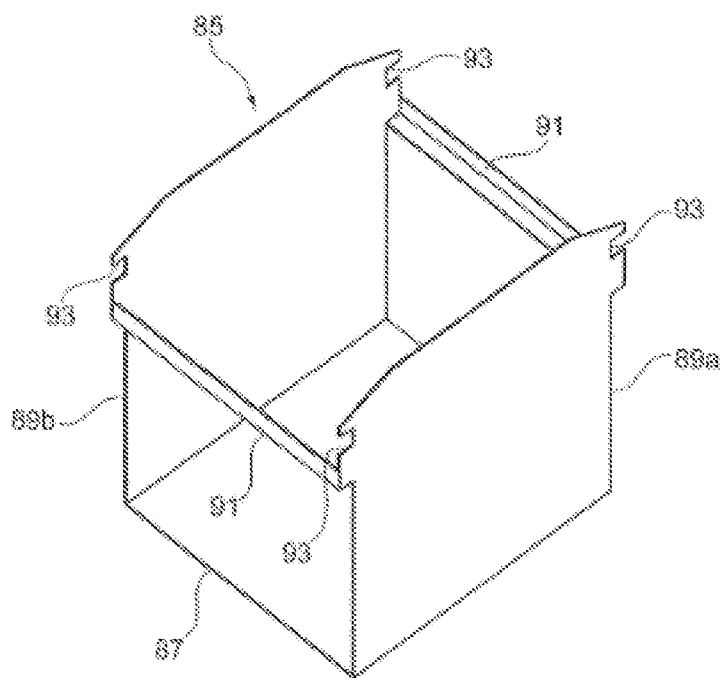
FIG. 3 shows a single, empty carrier basket according to FIG. 2.

A single carrier basket 85 is shown in FIG. 3. It consists of one rectangular platform 87, to which walls 89a, 89b connect at two opposite sides. The walls 89a, 89b are connected to each other by upper struts 91 in order to provide the carrier basket 85 with the necessary stability. At the upper end above the two struts, eyelets 93 are formed in the walls 89a, 89b, by means of which the carrier baskets 85 can be lifted by a crane.

Figure 4:
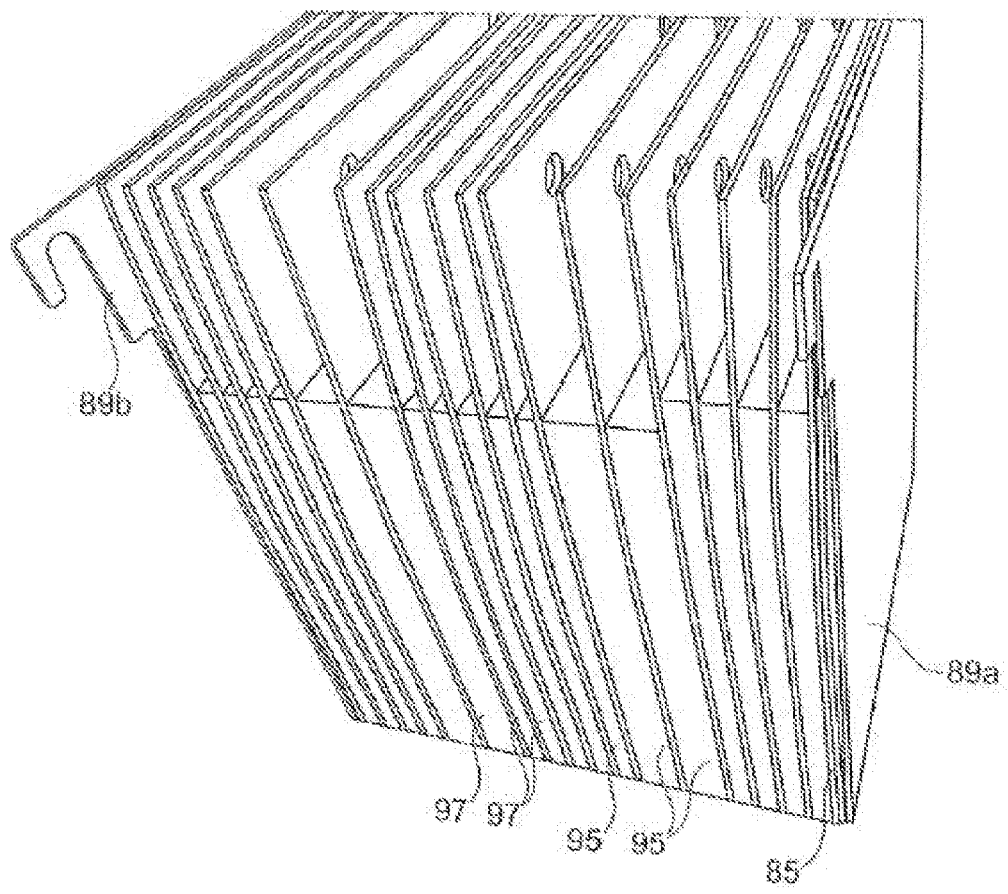
FIG. 4 shows a carrier basket loaded with a plurality of fiber mats and intermediate plates.

FIG. 4 shows a loaded carrier basket 85. Between the walls 89a, 89b, fiber mats 95 and intermediate plates 97 are alternately arranged, i.e. between two adjacent fiber mats 93, an intermediate plate 95 is respectively provided. After the gelling and hydrophobizing process and the removal of the intermediate plate, a gap is thereby formed between the fiber mats 95. Through this gap, hot drying gas, such as air, can be passed through for the purpose of drying the aerogel plates. This makes it possible to dry the aerogel plates directly in the reaction vessel 11.

Figure 5:
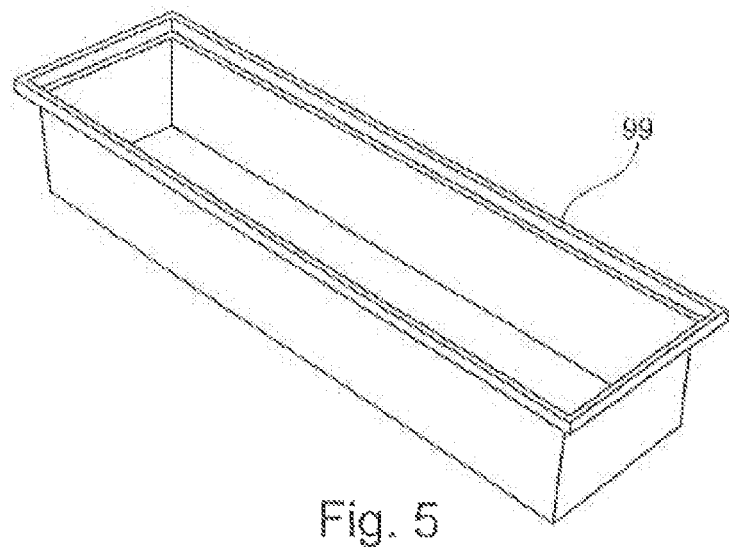
FIG. 5 shows the inner trough of the reactor vessel of FIG. 2.
Figure 6:
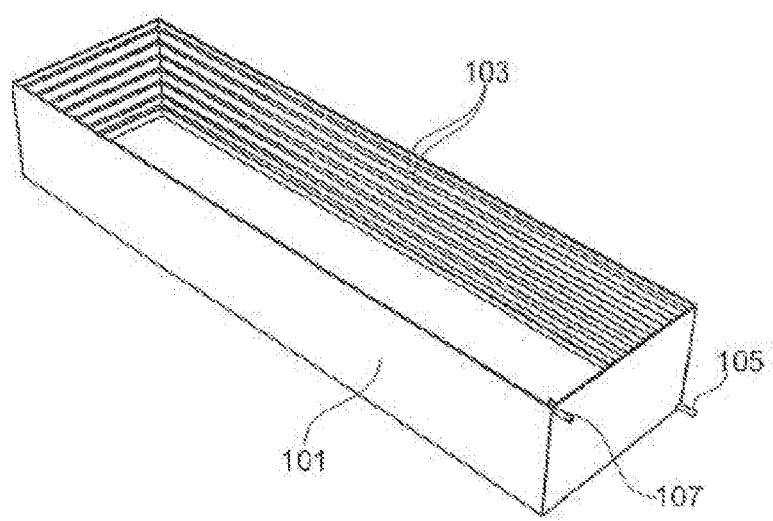
FIG. 6 shows the outer shell of the trough of FIG. 2.

The trough 81 according to FIGS. 5 and 6 is double-walled and consists of an inner trough 99 and an outer shell 101. On the inner side of the outer shell, circumferential baffles 103 are provided, which, when the inner trough 99 is inserted, form a spiral channel, which leads from the inlet 105 to the outlet 107.

In order for the solvent and air to flow through the reaction vessel as unhindered as possible, the platform 87 of the carrier basket 85 has a plurality of perforations 109. It is conceivable that at the bottom of the reaction vessel also baffles or channels are provided in order to direct the air in the spaces between the fiber insulation boards.

The manufacturing process of a fiber-reinforced composite thermal insulation board is as follows: First, a sol is prepared starting from an organic organosilane compound. The organosilane compound used is tetraethoxysilane (TEOS for short), which can be obtained inexpensively in large quantities. A desired amount of TEOS is transferred to the mixing vessel 27 and diluted with a certain amount of alcohol to allow the TEOS to reach the desired concentration. Alcohol is introduced into the mixing vessel 29 and a defined amount of sulfuric acid is dissolved. The alcoholic TEOS solution and the alcoholic sulfuric acid solution are then transferred to the reaction vessel 33 and stirred vigorously by means of the stirrer. To start the hydrolysis of the TEOS, a small amount of water is supplied via the line 45. At 40° C. to 60° C., it takes between 1 and 6 hours, until the TEOS hydrolyzes and the sol is formed. The sol thus prepared is then transferred to the reactor 11, in which a plurality of fiber insulation boards were previously arranged alternately with intermediate plates. The fiber mats and intermediate plates are arranged in the carrier basket 91 and thus can all be transferred into the reactor all at once. In the reactor 11, then, such an amount of the sol is admitted until the insulating fiber boards are covered with the sol. Then the reaction mixture is heated to about 50° C. to 70° C. and basified by adding an appropriate amount of ammonia solution. Once the reaction mixture is basified, gelling begins immediately. Normally gelling will take 5 to 15 minutes. Thereafter, the gel is aged at the same temperature for 72 hours. After that time the gelation is almost completed.

Thereafter, the solvent mixture is discharged into the vessel 35 and subsequently purified by distillation. Since the mixture consists predominantly of ethanol, the majority of the ethanol used for the gel formation can be recovered and returned to the reservoir 15.

After draining the solvent mixture, the reactor 11 is filled with HMDSO from the reservoir 23 until the insulating fiber boards are covered with the solution. Then, nitric acid dissolved in ethanol is added in the mixture and the pH is adjusted to between 1 and 3. At the same time the temperature of the reactor is raised to about 60° C. to 78° C. Under these conditions, the free OH groups react with the multiple excess of HMDSO and are thereby passivated.

Depending on the chosen temperature, the hydrophobizing lasts between about 1 and 5 hours (24 h at 75° C.). At 75° C., the hydrophobizing takes between 1 and 2 hours. After the hydrophobization is completed, the reaction mixture is discharged and transferred to the vessel 35. Thereafter, a small amount of water is added to the reaction mixture and allowed to rest between 10 and 24 hours until a lower water phase and an upper organic phase are formed. The water phase containing salts and partially reacted HMDSO is drained and disposed of. The rest, which is prevalently HMDSO, is then returned via line 63 into the reservoir 23 and used for the hydrophobization of a subsequent charge. It has been shown that the hydrophobization can also proceed satisfactorily with solutions in which the proportion by weight of HMDSO is only 70%. If the hydrophobizing reaction is no longer satisfactory, then the mixture can be distilled and practically pure HMDSO can be recovered. According to practical experiments in a hydrophobization reaction, only between 3% and 6% of the HMDSO are used. This means that only between 3% and 6% of the HMDSO used must be replaced again so that the original amount of HMDSO is restored. Overall, the manufacturing process is highly process-optimized, since only a few waste products are produced. The solvent EtOH can mostly be reused. The acids HNO3 and H2SO4 are used only in catalytic amounts, and the other organic reagents HMDSO and TEOS are mostly converted in the hydrolysis or hydrophobization or can be reused in a subsequent reaction.

Precursor P75E20:
Pre-product Production Batch:
At room temperature (RT), provide TEOS 77.3 L (72.7 kg), add 16.6 L (13.1 kg) of ethanol (=MIX A) at 600 rpm,
Place 16.6 L (13.1 kg) of ethanol in a small feed vessel, add H2SO4 95-98% m/m, 32.9 mL (60.5 g) (=MIX B), exothermal reaction (~30-35° C.)
Add MIX B to MIX A in 1 h @ RT @ 600 rpm
Add 9.4 L (9.4 kg) H20 in 2 h @ RT @ 600 rpm
Load precursor and store, total pre-product 119.93 L
Sol Production:
Add 47.1 L (42.9 kg) P75E20 or precursor or pre-product, add 113.8 L (89.8 kg) ethanol with stirring at RT @ 600 rpm, increase stirring to 900 rpm and condition sol to 45° C.
Sol Act. Gelling:
At Tmax. switch off heating and add base solution (activation, initiator, pH adjustment, adjust H2SO4 (Precursor)
Base Solution:
5.1 L H2O+0.4 L NH$_4$OH 28-30% m/m: Total 55 L base solution (0.54 M)
Production of the Aerogel Fiber Composite Material
47.1 L of a prehydrolyzed sol (75% prehydrolyzed, 20% (m/m) SiO$_2$ content) in EtOH (abs.) is diluted with a little more than twice the amount of ethanol (113.8 L) and homogenized with stirring (900 rpm). At the same time, the mixture is heated to approximately 45° C. Once the temperature has settled and the mixture is homogenized, an aqueous NH$_4$OH aqueous solution (0.4 L aqueous base+5.1 L H2O (ca. 5 L, 0.55 M) is added to the sol, briefly homogenized and then transferred to the reactor 11 provided with a temperature sensor, in which already a plurality of mineral fiber mats with a specific weight between 40 kg/m3 and 70 kg/m3 is introduced. Thereafter, the contents of the vessel are heated to about 65° C., and the mixture is left to age. Aging of the gel occurs between 6 and 96 hours, between 24 and 84 hours, or for about 48-72 hours. After gelling, the solvent is released, transferred to the vessel 35 and worked up by distillation.

The reactor 11 is then filled with such an amount of HMDSO that the fiber mats are covered, and heated to about 75° C. Gel in the same vessel is hydrophobized by adding an excess of HMDSO (presently about 70 L of a 60% to 98% (m/m) HMDSO (+HNO3 in EtOH solution) and about 5 L of a substantially alcoholic HNO3 solution (approx. 4 to 9% m/m) for 24 h at 75° C. dynamically, i.e. by circulation of the liquid phase.

After cooling, the partially used hydrophobizing solution is transferred to the mixer/settler 35 and diluted with a little water (about 10% of the volume of solvent present). Two phases then form, an aqueous, lower phase which can be disposed of, and an organic upper phase which contains the HMDOS and which can be reused in a next batch.

Once the partially spent HMDSO solution is drained, the intermediate plates 97 are removed and immediately hot air, heated to about 150° C., is blown through the line 77 into the reaction vessel 11. Via the line 75 connected to the vessel cover 83, the air saturated with solvent and HMDSO leaves the reactor 11. In the cyclone separator 77 then the solvent, HMDSO and water are condensed after the air passing through the heat exchanger 79 was previously slightly cooled. To the surprise of the inventors, the fiber mats can be dried immediately with hot air at a temperature of between 100 and 150° C., desireably about 150° C., without them becoming brittle, collapsing or substantially shrinking. The air is reheated after the condensing of the volatile components (solvent and HMDSO) and then re-circulated to the reactor.

In the mixer/settler 36, about 10% by volume of water is added to the hydrophobizing solution used and the mixture is stirred vigorously for 10 to 30 minutes. Thereafter, the mixture is allowed to stand overnight with an aqueous phase settling to the bottom. The aqueous phase is separated and discarded. The reclaimed hydrophobizing solution may then be reused in a next batch, optionally after being concentrated with HMDSO.

The present invention relates to a system and a method for producing an aerogel composite material. The system is characterized by having a reaction vessel with a removable carrier basket for receiving a plurality of fiber mats and a plurality of plates to space the fiber mats apart. After the removal of the plates between the aerogel insulating plates, gaps are provided, through which hot drying air can be blown during drying. The method has the advantage that the amounts of solvents and reagents to be disposed of are minimal and that no elaborate work-up processes are necessary.

The invention claimed is:

1. A system for industrial production of a fiber-reinforced aerogel plate, comprising:
   a first reservoir for a solvent,
   a second reservoir for an organosilane compound,
   a third reservoir for a hydrophobizing agent,
   a fourth reservoir for an acid,
   a fifth reservoir for a base,
   a reaction vessel for receiving a plurality of fiber mats,
   a cover for the reaction vessel,
   a plurality of connecting lines between the first, second, third, fourth and fifth reservoirs and the reaction vessel,
   a removable basket for receiving the plurality of fiber mats in the reaction vessel, and
   a plurality of plates to space the plurality of fiber mats apart from each other.

2. The system according to claim 1, further comprising a first heat exchanger device on the reaction vessel to heat or cool the reaction vessel or contents of the reaction vessel to a specific temperature.

3. The system according to claim 1, further comprising
   a connection on the reaction vessel for blowing a drying gas,
   a supply line connected to a port for the drying gas, the supply connected to a heating device,
   a discharge line for the drying gas, in communication with a second heat exchanger on the reaction vessel, and a blower or a pump for introducing the drying gas into or drawing it from the reaction vessel.

4. The system according claim 1, further comprising a removable carrier basket in the reaction vessel, in which the plurality of fiber mats are arranged.

5. The system according to claim 1, further comprising a mixer/settler with a stirrer, the mixer/settler in communication with the reaction vessel with a first line and in communication with the first reservoir with a second line.

6. The system according to claim 5, wherein the second line is in communication with a distillation device.

7. The system according to claim 5, wherein the mixer/settler is connected via the first line line to the third reservoir.

8. The system according to claim 3, wherein the second heat exchanger is in communication with the reaction vessel with a recirculation line.

9. The system according to claim 1, further comprising a separate heating/cooling circuit to heat the reaction vessel.

10. A system for the industrial production of a fiber-reinforced aerogel plate, comprising:
    a plurality of reservoirs comprising:
       a first reservoir for a solvent,
       a second reservoir for an organosilane compound,
       a third reservoir for a hydrophobizing agent,
       a fourth reservoir for an acid, and
       a fifth reservoir for a base,
    a reaction vessel for receiving a plurality of fiber mats,
    a plurality of connecting lines between said plurality of reservoirs and the reaction vessel,
    wherein the reaction vessel is in communication directly or indirectly with the first reservoir and the third reservoir teach via a recirculation line.

11. The system according to claim 10, further comprising, a first heat exchanger on the reaction vessel to heat or cool the reaction vessel or contents of the reaction vessel to a specific temperature.

12. A method for producing a fiber-reinforced aerogel plate, comprising:
    preparing a silicatic sol,
    hydrophobizing the gel with a hydrophobizing agent in the presence of an acid as catalyst,
    arranging initially a plurality of fiber mats and a corresponding plurality of intermediate plates alternately in a reaction vessel, so that two fiber mats of the plurality of fiber mats are separated from each other by a respective intermediate plate of the plurality of intermediate plates,
    adding the silicate sol to the reaction vessel until gelling is started, and
    draining a reaction solution from the reaction vessel after gelling of the gel, removing the intermediate plates and drying the formed, fiber-reinforced aerogel plates at a temperature >100° C.

13. The method according to claim 12, further comprising spacing adjacent fiber mats from each other by at least 10 mm.

14. The method according to claim 12, further comprising arranging the fiber mats on a carrier basket, which fits into the reaction vessel.

15. The method according to claim 12, wherein the drying of the fiber-reinforced aerogel plates takes place within the reaction vessel.

16. The method according to 15, wherein the drying takes place by blowing a hot drying gas through the reaction vessel.

17. The method according to claim 15, further comprising circulating the drying gas and condensing out volatiles absorbed in the drying gas.

18. The method according to any one of claim 12, wherein the drying takes place at temperatures >120° C.

19. The method according to claim 12, wherein the gelling, hydrophobizing and drying are carried out in the reaction vessel.

20. The method according to claim 12, further comprising using hexamethyldisiloxane (HDMSO) as the hydrophobizing agent.

21. The method according to claim 12, wherein in the hydrophobizing a ratio of solvent and water is at least 4%.

22. The method according to any one of claim 12, wherein a proportion by weight of the hydrophobizing agent in a liquid hydrophobizing solution is at least 50%.

23. The method according to claim 12, further comprising using nitric acid as the acid.

24. The method according to claim 12, wherein the silicate sol is prepared by hydrolysis of alkoxysilanes or hydroxyalkoxysilanes.

25. The method according to to claim 12, wherein the preparation of the sol is carried out in alcohol or an alcohol-containing solvent mixture.

26. The method according to claim 12, further comprising adjusting a pH in the hydrophobizing to a value between 0.2 and 6.

27. The method according to claim 12, further comprising preparing the sol by hydrolysis of tetraethoxysilane (TEOS) with a mass fraction of between 5 and 30 percent by weight of $SiO_2$.

28. The method according to claim 12, wherein the gelling occurs in a temperature range between 30° C. and 80° C.

29. The method according to claim 12, further comprising mixing the sol with mineral fibers.

30. The method according to claim 29, further comprising using rockwool fibers as the mineral fibers.

31. The method according to claim 12, wherein the hydrophobization is carried out in situ without prior solvent exchange.

32. The method according to claim 12, further comprising adding a silylating agent when preparing the silicatic sol.

33. The method according to claim 12, further comprising forming a composite material of an aerogel and mineral fibers havinq a thermal conductivity between 8 and 25 mW/m K.

* * * * *